United States Patent
Kodosky et al.

(10) Patent No.: US 7,865,349 B2
(45) Date of Patent: Jan. 4, 2011

(54) SIMULATION, MEASUREMENT AND/OR CONTROL SYSTEM AND METHOD WITH COORDINATED TIMING

(75) Inventors: Jeffrey L. Kodosky, Austin, TX (US); Jack E. MacCrisken, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1216 days.

(21) Appl. No.: 10/053,521

(22) Filed: Jan. 18, 2002

(65) Prior Publication Data

US 2002/0111783 A1   Aug. 15, 2002

Related U.S. Application Data

(60) Provisional application No. 60/262,831, filed on Jan. 19, 2001.

(51) Int. Cl.
  G06F 17/50 (2006.01)
  G06F 9/44 (2006.01)
  G06G 7/62 (2006.01)
(52) U.S. Cl. .......................................... 703/17; 703/21
(58) Field of Classification Search ................... 703/17
    See application file for complete search history.

(56) References Cited

U.S. PATENT DOCUMENTS

| | | | | |
|---|---|---|---|---|
| 5,574,854 A | * | 11/1996 | Blake et al. | 714/28 |
| 5,801,942 A | | 9/1998 | Nixon et al. | |
| 5,822,563 A | * | 10/1998 | Sitbon et al. | 719/330 |
| 5,828,851 A | | 10/1998 | Nixon et al. | |
| 5,838,563 A | | 11/1998 | Dove et al. | |
| 5,838,948 A | * | 11/1998 | Bunza | 703/27 |
| 5,861,882 A | | 1/1999 | Sprenger et al. | |
| 5,946,474 A | * | 8/1999 | Skogby | 703/13 |
| 6,002,861 A | * | 12/1999 | Butts et al. | 703/16 |
| 6,047,387 A | * | 4/2000 | Chang et al. | 714/33 |
| 6,078,320 A | | 6/2000 | Dove et al. | |
| 6,134,516 A | * | 10/2000 | Wang et al. | 703/27 |
| 6,182,242 B1 | * | 1/2001 | Brogan et al. | 714/26 |
| 6,874,148 B1 | * | 3/2005 | Richardson et al. | 719/328 |
| 6,912,429 B1 | * | 6/2005 | Bilger | 700/19 |
| 2002/0052725 A1 | | 5/2002 | Wasynczuk et al. | |
| 2002/0053086 A1 | * | 5/2002 | Vanderpohl et al. | 725/78 |
| 2002/0064149 A1 | * | 5/2002 | Elliott et al. | 370/352 |
| 2004/0002843 A1 | * | 1/2004 | Robarts et al. | 703/13 |

* cited by examiner

*Primary Examiner*—Paul L Rodriguez
*Assistant Examiner*—Andre Pierre Louis
(74) *Attorney, Agent, or Firm*—Meyertons Hood Kivlin Kowert & Goetzel, P.C.; Jeffrey C. Hood; Jason L. Burgess (57) ABSTRACT

A system and method for coordinating timing between simulation of a system and measurement and/or control of the system. A measurement/control loop comprising a measurement/control program, a simulation program, and an execution coordination kernel is described. The simulation program may be operable to simulate any of various types of systems. The measurement/control program may provide measurement/control logic for measuring various variables associated with the simulated system. The execution coordination kernel is responsible for coordinating the execution and time advancement of the measurement/control and simulation programs. The execution coordination kernel may be operable to intercept I/O calls produced by the measurement/control program and the simulation program. If the execution coordination kernel determines that the system is in simulation mode, the calls may be routed to software routines instead of to the I/O hardware.

20 Claims, 7 Drawing Sheets

FIG. 7

SIMULATION, MEASUREMENT AND/OR CONTROL SYSTEM AND METHOD WITH COORDINATED TIMING

PRIORITY CLAIM

This application claims benefit of priority of U.S. provisional application Serial No. 60/262,831 titled "Simulation, Measurement and/or Control System and Method with Coordinated Timing" filed Jan. 19, 2001, whose inventors are Jeffrey Kodosky and Jack MacCrisken.

FIELD OF THE INVENTION

The present invention relates to the fields of simulation and measurement and/or control systems, and more particularly to a system and method for coordinating timing between simulation of a system and measurement and/or control of the system.

DESCRIPTION OF THE RELATED ART

Figure 1:
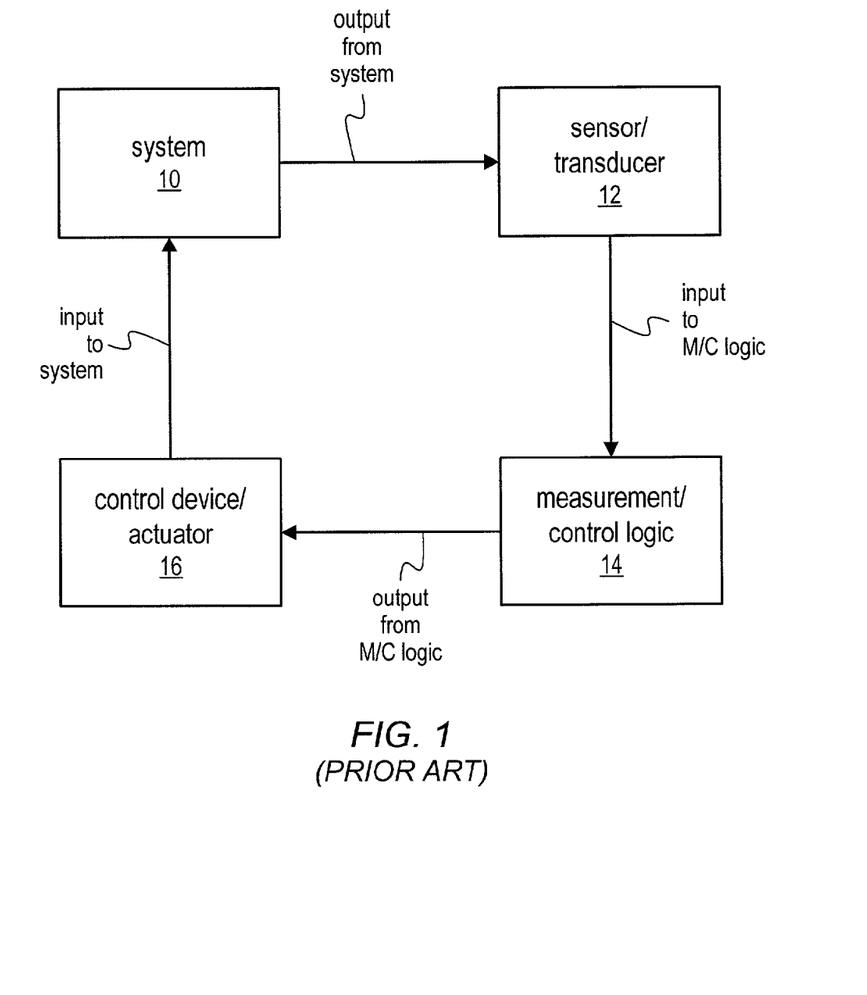
FIG. 1 (prior art) illustrates an example of a simple measurement/control loop.

The use of measurement/control loops for measuring and/or controlling a wide variety of systems is constantly increasing. FIG. 1 (prior art) illustrates an example of a simple measurement/control loop. The system 10 shown in FIG. 1 may be any of various types of apparatuses, processes, or conditions. The system 10 may include any of various types of physical, mechanical, electrical, chemical, or thermodynamic elements, among others, or some combination of such elements. For example, in various embodiments, the system 10 may be an engine or an engine component, a device in motion, a chemical reaction, a petroleum refining process, a room maintained at a setpoint temperature, a system of liquids flowing among different tanks, etc.

As shown in FIG. 1, the measurement/control loop may also include a sensor/transducer 12 which is operable to sense one or more variables of the system 10 and output a signal based on the variable(s). The sensor/transducer 12 may be operable to sense any of various types of system variables, depending on the type of the system 10. Examples of system variables that may be sensed include variables related to: motion and force (acceleration, altitude, displacement, force, torque, pressure, velocity, strain, etc.), fluid conditions (flow, pressure, liquid level, etc.), electromagnetism (light, radioactivity, voltage, current, etc.), chemistry, sound, temperature, humidity, proximity, etc. The sensor/transducer 12 may comprise any of various types of devices or combinations of devices operable to sense the variable(s) of interest and produce an output signal based on the variable(s). The signal produced by the sensor/transducer 12 is most typically an electrical signal, e.g., a voltage or current, but may also be any of various other types of signals.

FIG. 1 also illustrates a block 14, labeled "measurement/control logic 14" which receives the output signal produced by the sensor/transducer 12. The measurement/control logic 14 may comprise hardware and/or software elements. For example, in one embodiment, the measurement/control logic 14 may include a software program running in a digital computer, such as a desktop computer or workstation. The signal received from the sensor/transducer 12 may be converted into a form usable by the program, e.g., by utilizing an analog-to-digital (A/D) converter. In other embodiments, the measurement/control logic 14 may be implemented differently, e.g., as an embedded microcontroller programmed with software, as a programmable logic device, as a specialized hardware circuit or other type of control unit designed to perform the measurement/control functions, etc.

The measurement/control logic 14 may be operable to produce an output signal in response to receiving the signal from the sensor/transducer 12 as input. For example, the measurement/control logic 14 may measure and evaluate the input signal, e.g., to determine whether the current value of the system variable(s) differs from a value that the variable(s) should be, as determined by the measurement/control logic 14. The measurement/control logic 14 may determine the value that the system variable(s) should be in any of various ways, e.g., based on internal logic, the past history of the system, and/or other input received. If the system variable value(s) should be changed, the measurement/control logic 14 may produce an appropriate control signal output. The measurement/control logic 14 may also produce output signals for purposes other than control, e.g., in order to provide information to the system.

As shown in FIG. 1, a control device/actuator 16 may receive the control signal output produced by the measurement/control logic 14. The control device/actuator 16 may be operable to adjust one or more system variables, as directed by the control signal. The control device/actuator 16 may comprise any of various types of devices, as appropriate for a particular system. For example, the control device/actuator 16 may comprise: a switch that may be opened or closed, a valve that may be adjusted, a motor that may be started, stopped, reversed, etc., or any other type of control device, such as solenoids, relays, solid-state control elements, etc. In response to the operations performed by the control device/actuator 16, the state of the system 10 may be altered.

It is noted that FIG. 1 represents one simple example of a measurement/control loop, and many variations exist in the art. For example, FIG. 1 may be termed a "closed-loop" example, since the measurement/control logic 14 accepts feedback input that may affect the control signals produced by the measurement/control logic 14. The measurement/control logic 14 may sample the feedback input at any of various sample rates. "Open-loop" examples are also possible, in which the measurement/control logic produces output control signals, but does not accept feedback input based on system variables. For example, measurement/control logic associated with a simple hot water heater may simply turn gas to the heater on and off at regular intervals, regardless of the water temperature or other variables associated with the hot water heater system.

It is noted that the various elements of the measurement/control loop discussed above do not necessarily have fixed boundaries corresponding to the blocks shown in FIG. 1. For example, the measurement/control logic 14 may be implemented in a control unit embedded in the system 10, and thus may be considered to be part of the system 10 at one level. As another example, the measurement/control logic 14 may be one aspect of a larger program or circuit that performs other functions in addition to measurement/control of the system 10. Also, other examples of measurement/control loops may include multiple of the blocks shown in FIG. 1. For example, the measurement/control logic may be distributed across multiple components, instruments, or computers, may act on the basis of signals received from multiple sensors/transducers, may control multiple control devices/actuators, etc.

Computerized simulation is increasingly being used in conjunction with measurement and control in order to simulate a system in a measurement/control loop. Simulation of a system may be implemented using software or a combination of software and hardware. Creating a system simulation typically involves creating a model of the system, wherein the model represents the system or represents certain aspects of the system. For a given system, the system may be modeled in any number of different ways. Thus, the type of model that is created may depend on the particular aspects of the system that the modeler is interested in or the particular purpose of performing the simulation. For example, depending on the particular system and the particular problem to be solved, modeling the system may involve creating a set of mathematical equations representing the system, creating representations of various structural elements of the system and relationships between the elements, creating representations of random factors that may affect the system, etc. Creating a model of a system generally involves simplifying or approximating certain aspects of the system. However, for some systems or problems, a simple, abstracted model may serve to solve the problem at hand quite well, whereas for other systems or problems, a more complex model representing many details of the actual system may be desirable.

There are many reasons why it may be necessary or desirable to simulate a system in a measurement/control loop. For example, in many situations, it may be necessary to test the measurement/control logic that will be used in an actual measurement/control loop, but it may be infeasible, impractical, or impossible to do so with the real system. For example, it may be necessary to test whether the measurement/control logic will work properly under extreme or emergency situations in which it would be dangerous or economically infeasible to perform the test with a real system, e.g., due to the possibility of harm to the system or the environment of the system. Also, the real system may operate under conditions that make it impossible to perform or monitor a test, as in a space flight or deep-sea dive.

Another situation in which simulation is useful is when the real system has not yet been created. In this instance, existing measurement/control logic may be coupled with a system simulation in the measurement/control loop, in order to test design variations and predict whether the planned system will operate as desired.

Simulation may also be useful in the design process of the measurement/control logic, rather than the system. For example, as the commercial applications of measurement/control systems constantly increase, along with the time-to-market and technical demands for these systems, it becomes more important to be able to test new measurement/control logic prototypes with a minimum of delay. Since coupling these prototypes with a real system may take a significant amount of time, it is often desirable to instead test the prototypes with a simulation of the system. A shorter turnaround time enables more iterations and modifications to the measurement/control logic prototypes, helps ensure a high quality product, enables new features to be introduced more quickly, etc.

As noted above, different simulations may be implemented very differently, depending on the objectives of the simulation. However, one aspect common to many types of simulations is the concept of time advancement. In other words, the model that a simulation is based on may be a dynamic model, so that simulations may undergo various types of state changes as time passes. The representation of time advancement may vary for different types of simulated systems. For example, some systems are termed "discrete-time systems" because they advance to successive stages in a series of jumps at separated points in time. For example, electronic systems are often described as discrete-time systems. Other systems are known as "continuous-time systems" because the state of system variables can change continuously with respect to time. For example, an automobile moving along a road may be considered as a continuous-time system, since various system variables, such as position and velocity, can change continuously with respect to time.

Representing the forward movement of time is often one of the most difficult aspects of creating a faithful simulation of a system. The problem may be complicated even farther when the simulation is introduced into a measurement/control loop, since the simulation must not only take into account the natural state changes as time passes, but must also coordinate with the measurement/control logic in order to respond appropriately to the control outputs produced by the measurement/control logic. While the simulation may have an internal representation of time, the measurement/control logic may also have its own internal representation of time, e.g., in order to sample variables of the simulated system at periodic intervals. These two time representations must be coordinated in order for the measurement/control loop to function properly. For example, if the simulation time is allowed to run ahead indefinitely between sample intervals, then the measurement/control logic may not receive an accurate reading of how variable changes occur in the simulated system.

One approach that has been taken in the prior art for coordinating the simulation with the measurement/control logic is to tightly couple the simulation with the measurement/control logic, e.g., by implementing both in a single software program. This approach has several disadvantages. One disadvantage is that the approach may conflict with the objectives of performing the simulation. For example, as noted above, it is sometimes desirable to test existing measurement/control logic together with a simulated system. However, in many cases it would be very difficult to modify the existing measurement/control logic, especially if the measurement/control logic is encapsulated in an apparatus, such as an electronic control unit designed for an engine.

Another disadvantage associated with the single-program approach is that creating the simulation portion of the program and creating the measurement/control portion of the program may require substantially different skills. However, due to the tight coupling of the two portions, the engineer who creates the simulation portion may have to understand how the measurement/control portion is constructed, and vice versa. Thus, it may be desirable to enable the simulation and the measurement/control logic to be implemented independently of each other.

Furthermore, it is often desirable for the measurement/control logic to be operable to interact with either a simulation of a system or with the real system, without requiring modifications to the measurement/control logic itself. Tightly coupling the measurement/control logic with the simulation may inhibit this capability.

Various of the disadvantages described above, as well as additional disadvantages, also appear in the prior art when the measurement/control logic and the simulation are implemented as separate programs which communicate with each other, e.g., through a message-passing mechanism. For example, the measurement/control program may still need to be modified in order to switch from interfacing with the simulation program to interfacing with the real system, e.g., by changing the program code to acquire input samples from a hardware device instead of from the simulation program. It would instead be desirable to provide a framework enabling this switch to occur seamlessly, without having to modify the measurement/control program.

A further problem which may appear in the coordination approaches described above is the problem of how to ensure that the simulation program has the computed simulation variables ready to provide to the measurement/control logic when the measurement/control logic is ready for them. In many cases, it is desirable to enable the simulated system to behave as closely as possible to a real-time system. Thus it may be unacceptable for the simulation to wait until simulation variables are requested by the measurement/control logic before beginning the computation of the variable values. It would instead be desirable to inform the simulation of the requested variables ahead of the time when the variables are actually needed, so that the variable values may be provided in response to the actual request with a minimum of delay.

Another feature heretofore lacking in the prior art is the ability to easily vary the speed of the simulation, so that the simulation time runs either slower or faster than real time, if desired. For example, it may be desirable to purposely slow down the simulation, e.g., in order to allow a user to view state changes that occur in the simulated system at a level of detail that would otherwise be impossible. In other cases it may be desirable to purposely speed up the simulation, e.g., in order to determine the simulation results in a reasonable amount of time.

Therefore, an improved system and method for coordinating timing between simulation of a system and measurement and/or control of the system are desired.

SUMMARY OF THE INVENTION

The problems outlined above may in large part be solved by providing a system and method for coordinating timing between simulation of a system and measurement and/or control of the system. A measurement/control loop comprising a measurement/control program, a simulation program, and an execution coordination kernel is described. The simulation program may be operable to simulate any of various types of systems, including discrete-time or continuous time systems. The measurement/control program may interface with the simulation program using the same techniques as for interfacing with a real system. This may advantageously enable an operator to switch between measurement/control of a simulated system and measurement/control of a real system without needing to modify the measurement/control program. The measurement/control program may provide measurement/control logic for measuring various variables associated with the simulated system and/or controlling the simulated system.

The execution coordination kernel is responsible for coordinating the execution and time advancement of the measurement/control and simulation programs. In many ways, the functions of the execution coordination kernel may be likened to the functions performed by an operating system, in that the execution coordination kernel may intercept input/output events generated by the measurement/control and simulation programs, may cause either program to begin or pause execution, etc.

In one embodiment, the measurement/control program may perform input/output operations via input/output (I/O) channels. These input/output operations may include input received by the measurement/control program comprising simulated or real variable values which the program logic is operable to process, and/or output produced by the measurement/control program comprising control commands for affecting the simulated or real system. The execution coordination kernel may be operable to intercept calls produced by the measurement/control program for requesting input or sending output through an I/O channel. If the execution coordination kernel determines that the system is in simulation mode, i.e., that the measurement/control program should interface with the simulation program instead of with a real system, then the execution coordination kernel may redirect the input or output event to the simulation program. Thus, instead of the I/O call being routed through hardware associated with the I/O channel, the call may instead be routed to a software routine associated with the simulation program. If the execution coordination kernel determines that the system is not in simulation mode, then the I/O call may be routed through to the hardware I/O channel as usual, e.g., through drivers associated with the hardware. A configuration utility for specifying whether or not the system is in simulation mode, as well as specifying the desired mapping between I/O channels and software routines, is described.

In one embodiment, the measurement/control program and/or the simulation program may be a graphical program, such as a LabVIEW or Simulink program. Exemplary graphical programs illustrating one embodiment of the methods disclosed herein are described.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
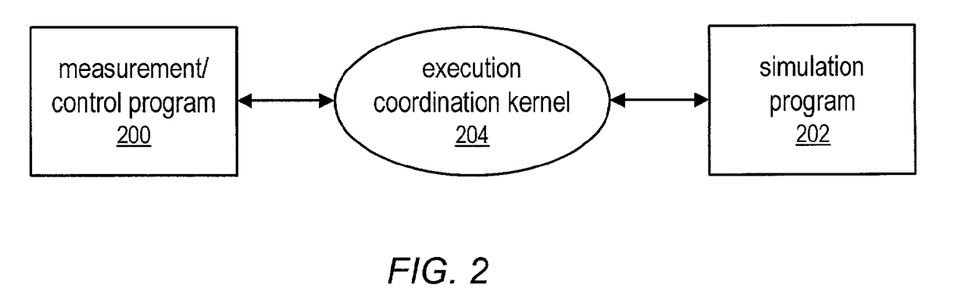
FIG. 2 is a block diagram of a system comprising a measurement/control program, a simulation program, and an execution coordination kernel.

FIG. 2—Exemplary System

FIG. 2 is a block diagram of a system comprising a measurement/control program 200, a simulation program 202, and an execution coordination kernel 204. The system shown in FIG. 2 may enable the creation of a measurement/control loop in which the measurement/control program 200 interacts with a simulated system, i.e., the simulation program 202, instead of with a real system. The execution coordination kernel 204 is responsible for coordinating the execution and time advancement of the measurement/control and simulation programs, as described below.

As used herein, the term "measurement/control program" may refer to any of various types of programs that implement measurement/control logic for a measurement/control loop, such as shown in FIG. 1. A measurement/control program 200 may perform any combination of measurement and/or control of a system or a simulated system, as well as other types of tasks. The program 200 may run in any of various types of computer systems, including desktop computers or workstations, embedded microcontrollers, electronic control units, programmable logic devices, mainframe computers, etc. The term measurement/control program may include software elements, hardware elements, or both. For example, in addition to referring to a traditional software program, a measurement/control program may also refer to a specialized hardware circuit in a real-time system, wherein the circuit implements measurement/control logic for the system. The program 200 may be written or designed using any of various types of programming techniques, tools, or languages, including text-based languages, such as C, C++, Java, Basic, etc., graphical programming development environments, such as LabVIEW, Simulink, etc., hardware description languages, etc.

Similarly, as used herein, the term "simulation program" may also refer to various types of programs. The simulation program 202 may simulate any of various types of systems, including apparatuses, processes, conditions, or some combination of these. The program 202 may be based on any of various types of models, wherein the models include representations of physical, mechanical, electrical, chemical, or thermodynamic elements, or other types of elements. Exemplary systems which may be simulated by the simulation program 202 include, but are not limited to: a device in motion, an engine or an engine component, a chemical reaction, a petroleum refining process, a room maintained at a setpoint temperature, a system of liquids flowing among different tanks, etc.

Similarly as described above for the measurement/control program 200, the simulation program 202 may run on any of various types of computer systems. The simulation program 202 may run on the same computer system as the measurement/control program 200 or on a different computer system, such as a second computer system connected via a network.

FIG. 2 illustrates a single measurement/control program and a single simulation program. However, in alternative embodiments, multiple measurement/control an/or simulation programs may be coordinated according to the system and method described herein.

In various embodiments, the execution coordination kernel 204 may be implemented in any of various ways, e.g., depending on whether the measurement/control and simulation programs are implemented as traditional software programs running on a microprocessor or whether they also include real-time hardware elements. In many ways, the functions of the execution coordination kernel 204 may be likened to the functions performed by an operating system, in that the execution coordination kernel may intercept input/output events generated by the measurement/control and simulation programs, may cause either program to begin or pause execution, etc. The functions of the execution coordination kernel 204 are discussed in more detail below.

Figure 3A:
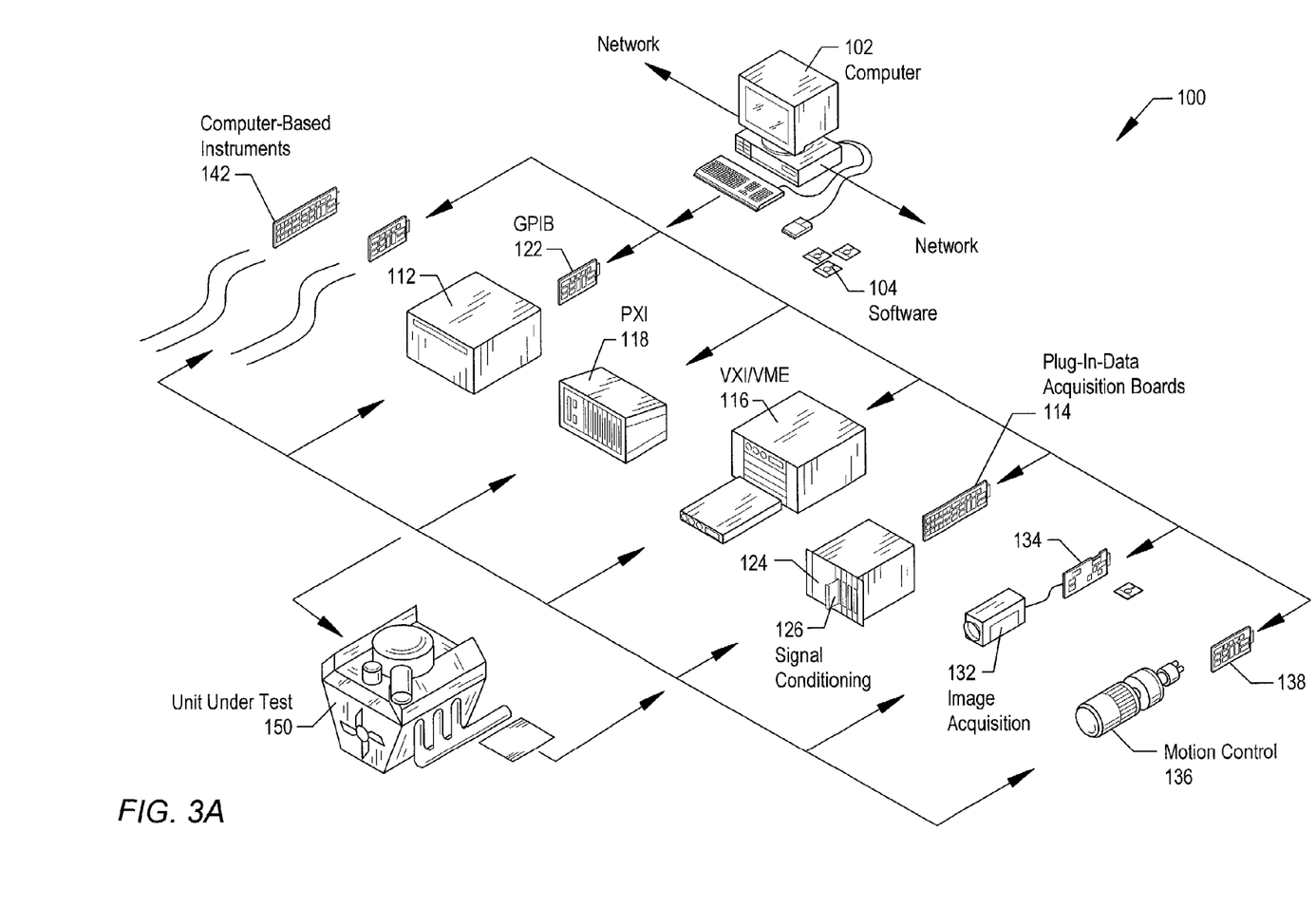
FIGS. 3A and 3B illustrate representative instrumentation and process control systems including various I/O interface options.
Figure 3B:
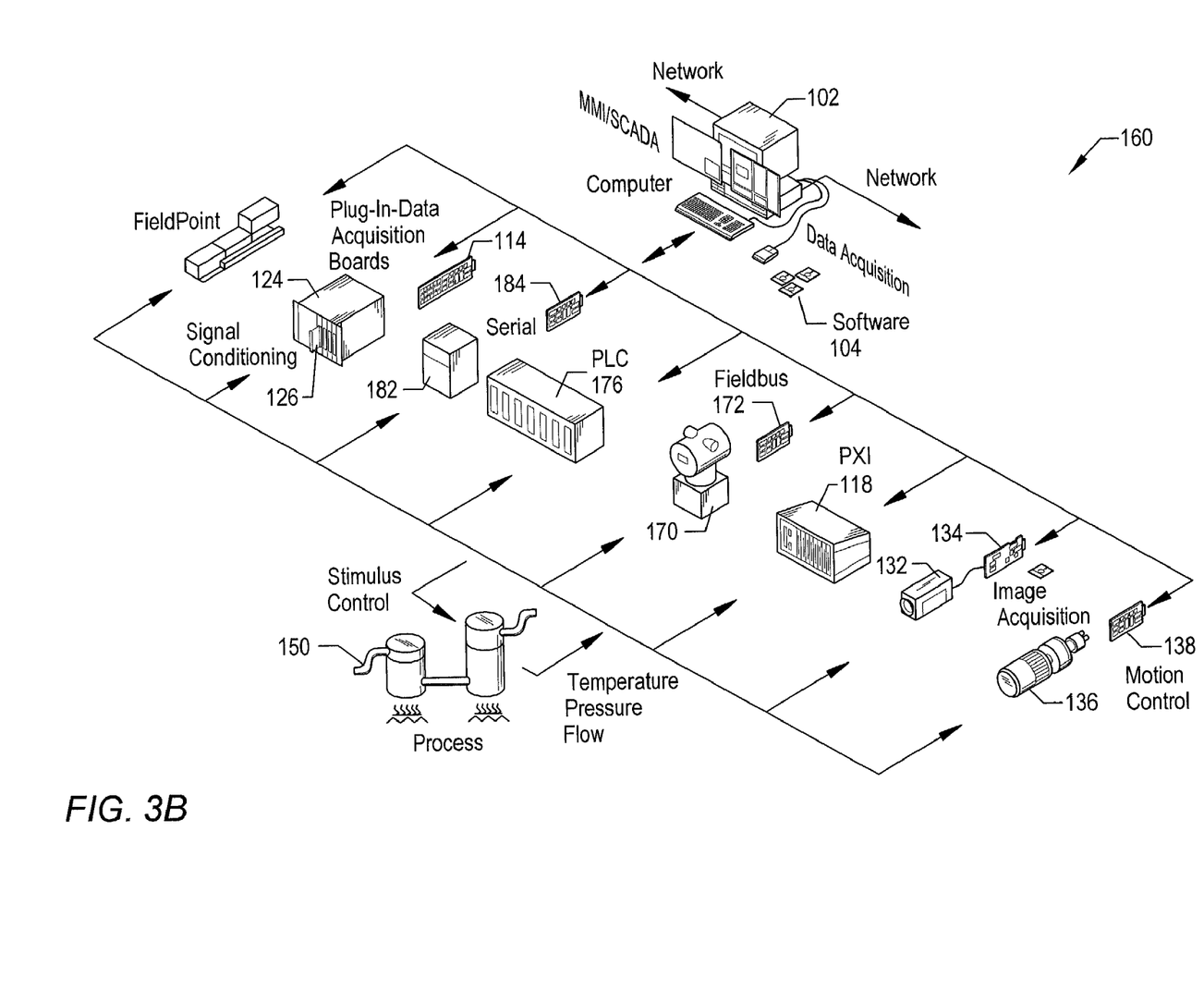

FIGS. 3A and 3B—Instrumentation and Industrial Automation Systems

As described above, in various embodiments, a measurement/control program and a simulation program may run in any of various types of systems, including desktop computers or workstations. FIGS. 3A and 3B illustrate exemplary systems in which one or more of the programs may run, wherein the systems include a computer connected to various types of devices. It may be desirable to run the measurement/control program in such a system, for example, so that the measurement/control program may easily switch between interacting with the simulation program and interacting with a real system. This type of switch is described in more detail below. It is noted that FIGS. 3A and 3B are exemplary only.

FIG. 3A illustrates an instrumentation control system 100. The system 100 comprises a host computer 102 which connects to one or more instruments. The host computer 102 comprises a CPU, a display screen, memory, and one or more input devices such as a mouse or keyboard, as shown. The host computer 102 connects through the one or more instruments to analyze, measure, or control a unit under test (UUT) or process 150. The host computer 102 may execute a measurement/control program that interacts with or controls the one or more instruments. The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 3B illustrates an exemplary industrial automation system 160. The industrial automation system 160 is similar to the instrumentation or test and measurement system 100 shown in FIG. 3A. Elements which are similar or identical to elements in FIG. 3A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 3B, the computer 102 may execute a measurement/control program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 3A and 3B, the computer system 102 may include a memory medium on which one or more computer programs or software components according to the present invention are stored. The term "memory medium" is intended to include an installation medium, e.g., a CD-ROM, floppy disks 104, or tape device, a computer system memory or random access memory such as DRAM, SRAM, EDO RAM, RRAM, etc., or a non-volatile memory such as a magnetic media, e.g., a hard drive, or optical storage. The memory medium may comprise other types of memory as well, or combinations thereof.

In addition, the memory medium may be located in a first computer in which the programs are stored or executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

Figure 4:
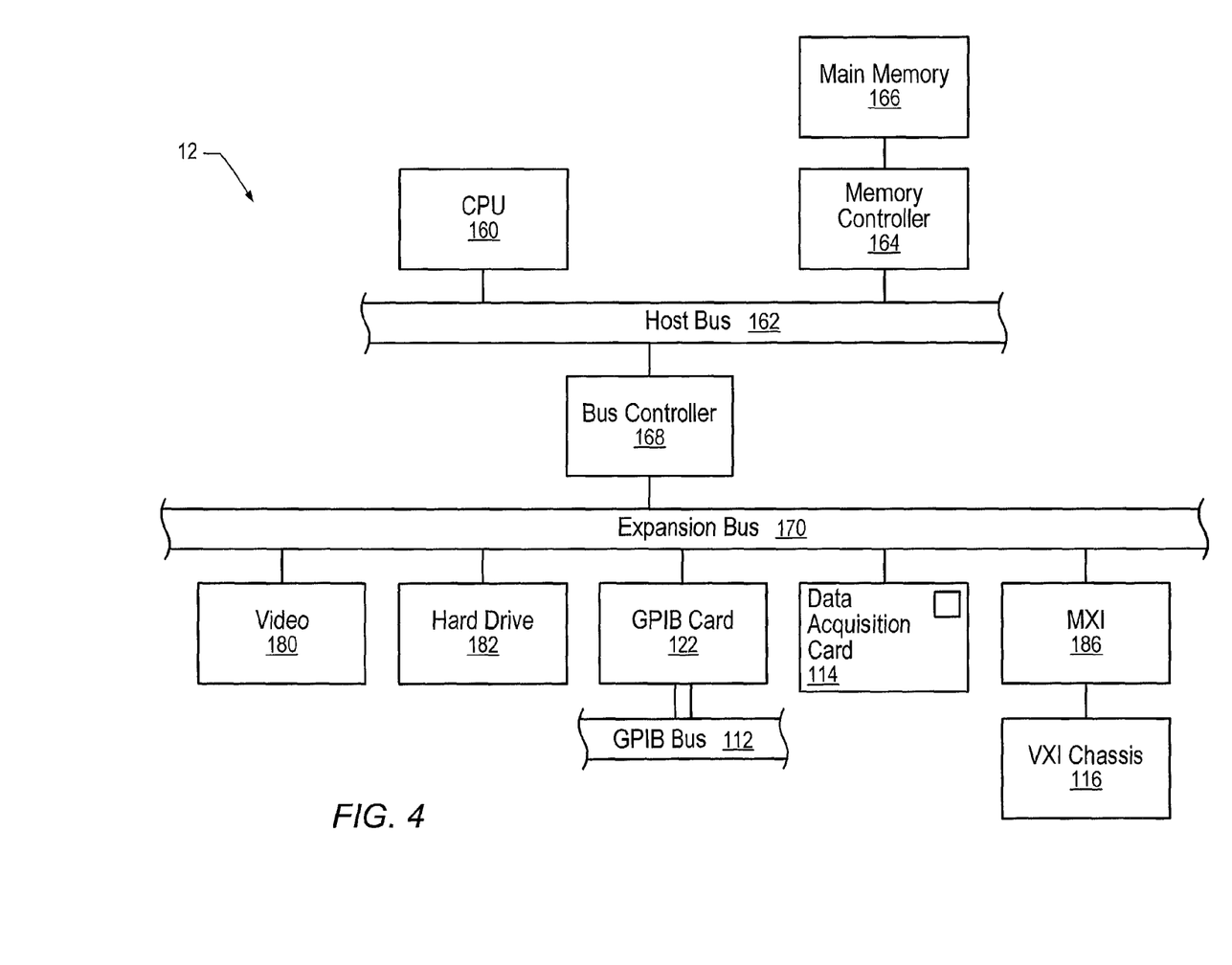
FIG. 4 is a block diagram of the computer system of FIGS. 3A and 3B.

FIG. 4—Computer System Block Diagram

FIG. 4 is an exemplary block diagram of the computer system illustrated in FIGS. 3A and 3B. It is noted that any type of computer system configuration or architecture can be used in conjunction with the system and method described herein, as desired, and FIG. 4 illustrates a representative PC embodiment. It is also noted that the computer system may be a general purpose computer system such as illustrated in FIGS. 3A and 3B, a computer implemented on a VXI card installed in a VXI chassis, a computer implemented on a PXI card installed in a PXI chassis, a programmable logic device, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store one or more computer programs or software components according to the present invention. The main memory 166 also stores operating system software as well as the software for operation of the computer system, as well known to those skilled in the art. The computer programs of the present invention are discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 102 further comprises a video display subsystem 180 and hard drive 182 coupled to the expansion bus 170.

Figure 5:
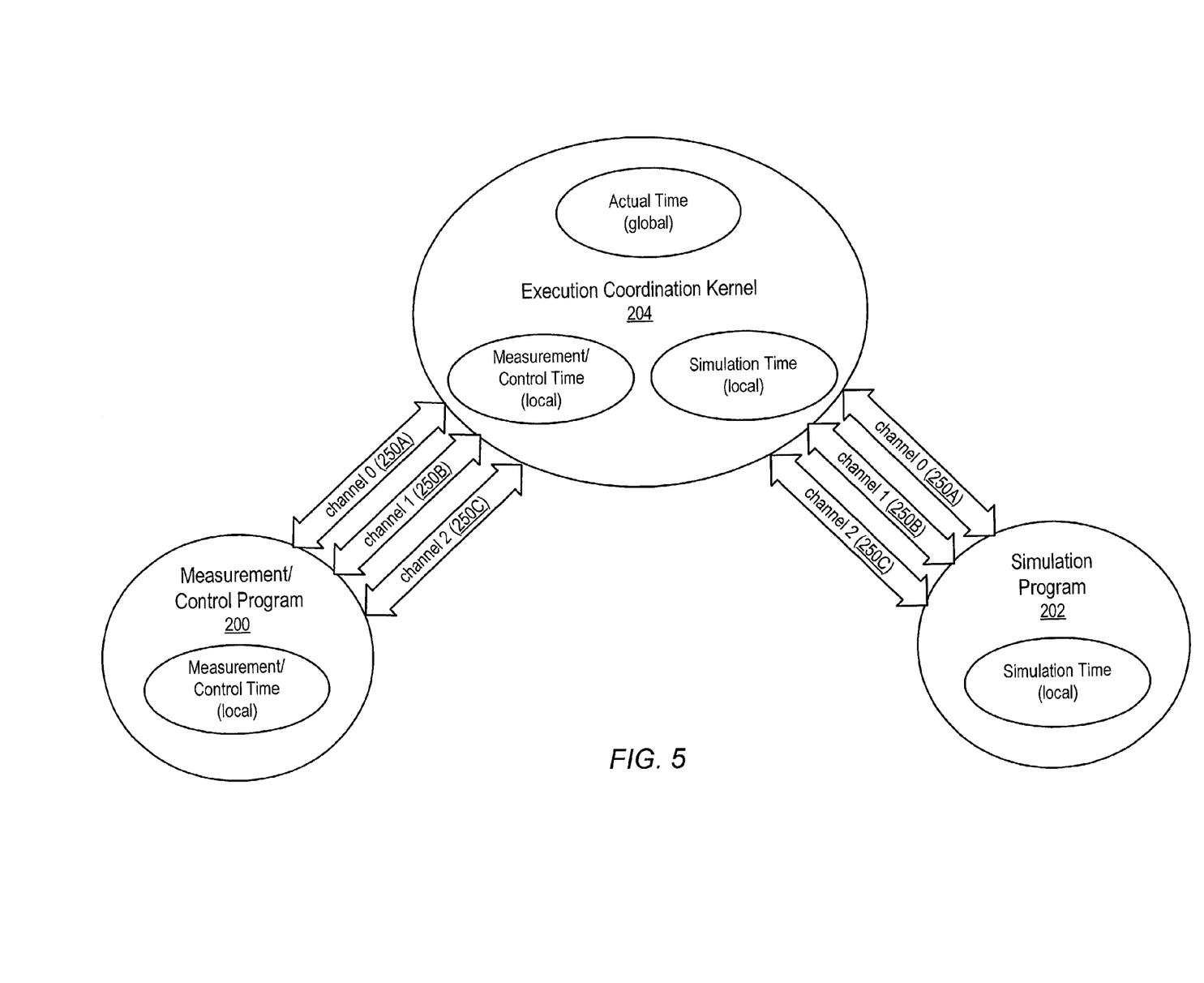
FIG. 5 is a block diagram illustrating one embodiment of the system shown in FIG. 2 in more detail.
Figure 6:
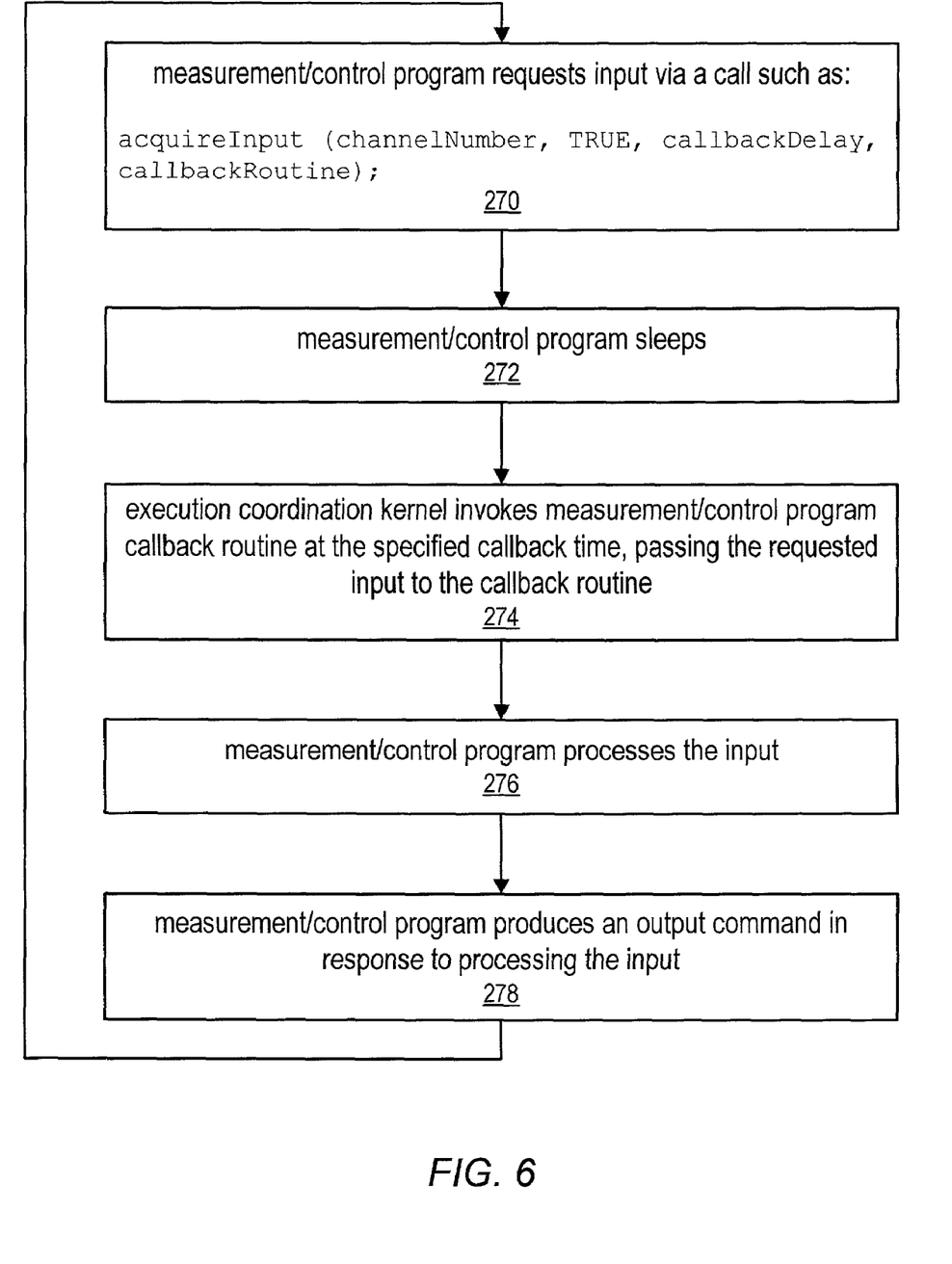
FIG. 6 is a flowchart diagram illustrating one specific embodiment of a measurement/control program performing a loop of requesting input, receiving the input at a specified time, processing the input, and producing an output command in response to processing the input.

FIGS. 5 and 6

FIG. 5 is a block diagram illustrating one embodiment of the system shown in FIG. 2 in more detail. FIG. 5 illustrates that the measurement/control program 200 may interface with the simulation program 202 just as if the simulation program were a real system. This may advantageously enable an operator to switch between measurement/control of a simulated system and measurement/control of a real system without needing to modify the measurement/control program.

FIG. 5 illustrates an embodiment in which the measurement/control program performs input/output operations via input/output (I/O) channels 250. These input/output operations may include input received by the measurement/control program comprising simulated or real variable values which the program logic is operable to process, and/or output produced by the measurement/control program comprising control commands for affecting the simulated or real system. In alternative embodiments, the measurement/control program may not use input/output channels such as shown in FIG. 5, but may use other input/output methods. For example, the measurement/control program may perform input/output operations by sending commands and receiving responses along a bus, wherein the commands and responses are formulated according to a particular instrumentation protocol.

The execution coordination kernel 204 may be operable to intercept calls produced by the measurement/control program 200 for sending output through an I/O channel 250. If the execution coordination kernel determines that the system is in simulation mode, i.e., that the measurement/control program should interface with the simulation program 202 instead of with a real system, then the execution coordination kernel may redirect the output to the simulation program 202. Thus, instead of the output call being routed through hardware associated with the I/O channel, the call may instead be routed to a software routine associated with the simulation program. If the execution coordination kernel determines that the system is not in simulation mode, then the output call may be routed through to the hardware I/O channel as usual, e.g., through drivers associated with the hardware. A configuration utility for specifying whether or not the system is in simulation mode, as well as specifying the desired mapping between I/O channels and software routines, is described below.

Output produced by the measurement/control program 200 may be viewed as input to the simulation program 202 and vice versa. Thus, output calls produced by the simulation program may be intercepted by the execution coordination kernel and routed to the measurement/control program, similarly as described above.

In addition to performing the desired mapping of I/O calls, the execution coordination kernel 204 may also be involved in managing execution and time coordination between the programs. As shown in FIG. 5, both the measurement/control program 200 and the simulation program 202 may maintain their own local versions of a clock, which may be relative to a global clock. The execution coordination kernel 204 may also possess knowledge of these local clocks.

In one embodiment, the measurement/control program may request an input by specifying a time when the input is needed, which may be relative to the local measurement/control time. FIG. 6 is a flowchart diagram illustrating one specific embodiment of a measurement/control program performing a loop of requesting input, receiving the input at a specified time, processing the input, and producing an output command in response to processing the input. As shown in step 270, the measurement/control program may request the input via a call such as:

acquireInput (channelNumber, TRUE, callbackDelay, callbackRoutine);

where channelNumber refers to an I/O channel with which the desired input is associated, TRUE is a Boolean parameter indicating that the measurement/control program should sleep after issuing the acquireinput ( ) call, callbackDelay specifies a time delay relative to the local measurement/control program clock when the measurement/control program desires to actually receive the input, and callbackRoutine specifies a callback routine to be invoked at the specified callback time to receive the input.

In step 272, the measurement/control program may sleep after issuing the acquireInput( ) call, using well-known operating system techniques. In this example, the program may sleep in response to specifying a parameter of TRUE in step 270. In more complicated examples, the measurement/control may not sleep but may perform other tasks while waiting for the input.

As described above, the execution coordination kernel may be operable to intercept input requests issued by the measurement/control program and route the requests to an appropriate function, object, or routine associated with the simulation program. The simulation program may receive the request, which may include information specifying the time when the request results are desired by the measurment/control program. The simulation program may then run the simulation forward up to the point specified by the measurement/control program and then produce an output including the desired variable values. Depending on the system being simulated and the model used to create the simulation, the simulation program may use all or a portion of the available time to compute the desired simulation variables. For example, for some problems, simulated results may become more and more accurate as more computation iterations are performed, whereas for other problems the variable values may only be computed using a one-pass process or algorithm.

The execution coordination kernel may intercept the output produced by the simulation program, similarly as described above when the input request issued by the measurement/control program was intercepted. In step 274, the execution coordination kernel may invoke the callback routine specified in step 270. If the execution coordination kernel receives the output produced by the simulation program before the callback time specified in step 270, then the execution coordination kernel may wait until the specified time before invoking the callback routine. Otherwise, the callback routine may be invoked immediately. Invoking the callback routine preferably comprises passing the output produced by the simulation program to the callback routine.

In step 276, the measurement/control program processes the input received when the callback routine is invoked in step 274. This processing may comprise performing any of various types of processes or calculations, depending on the purpose of the measurement/control loop. For example, this processing may comprise comparing the variable values received from the simulation program to desired setpoint values, comparing the values to values recorded during previous iterations of the loop, performing an algorithm using one or more of the values as parameters, or any other process.

In step 278, the measurement/control program may produce an output command in response to the processing performed in step 276, e.g., in order to regulate one or more of the simulated system variables. The output command may be intercepted by the execution coordination kernel and routed to the simulation program as described above. As shown, the loop may then repeat, e.g., in order to sample and process input from the simulated system at periodic intervals.

It is noted that in some embodiments steps 276 and/or 278 may be affected by user input. For example, the measurement/control program may have an associated graphical user interface that displays various controls, such as dials, switches, slides, etc., for regulating a system or a simulated system. The processing of the system variables and the output command that is produced may depend on the settings of these virtual controls. Similarly, the simulation program may have a graphical user interface of its own enabling an operator to interact with the simulation and affect the state of the simulated system, which may in turn affect the operation of the measurement/control program.

Utilizing a method such as shown in FIG. 6 may provide several advantages when running a simulation in a measurement/control loop. For example, since the simulation program can be informed of the time when the measurement/control program will need particular variable values before the time that the measurement/control program actually needs them, the desired variable values may in effect be computed ahead so that they are ready on time and no delay may be incurred when the measurement/control program expects the input.

It is noted that providing this information to the simulation program may be implicit in the input request itself so that no additional synchronization messages may be required. Coordinating the execution of the measurement/control program and the simulation program is accomplished by the actual input/output events generated by each program, not by additional events or messages. Thus the measurement/control program may be implemented just as if the program were interfacing with a real system, which may then make it easy to actually replace the simulation with a real system.

A method such as described above may also enable the simulation to easily be configured to run either faster or slower than real time, as desired by a user. For example, by adjusting the callbackDelay parameter to a larger value in step 270, the rate of the simulation may be decreased. This may be useful, for example, if the measurement/control program is operable to display a user interface indicating the state of the simulated system as the simulation advances in time, wherein the user interface would change too quickly for a user to understand or see the state changes if the simulation were to occur in accordance with actual time. As an example, it may be desirable to slow down a simulation of a fast chemical reaction.

On the other hand, by adjusting the callbackDelay parameter to a smaller value in step 270, the rate of the simulation may be increased. This may be useful, for example, if the measurement/control loop is simulating a process that would normally take a long time to complete, such as a very slow chemical reaction.

A measurement/control program may enable a user to increase or decrease the callback delay as desired in order to control the rate of the simulation, e.g., via a graphical user interface. However, this may entail modification of the measurement/control program. Also, a display screen may not be available for the measurement/control program to access. Thus, in an alternative embodiment, the rate of the simulation may be controlled using a configuration utility associated with the execution coordination kernel. For example, a user may specify a positive or negative delay to automatically be added by the execution coordination kernel to the callback delay specified by the measurement/control program. Such a configuration utility may also be used to specify other desired rate manipulations, e.g., by specifying that the measurement/control loop should run as fast as computationally possible, i.e., with no delay.

FIG. 6 represents one embodiment of a method for coordinating execution of a simulation program and a relatively simple measurement/control program. In a given implementation, many such measurement/control loops may be performed simultaneously. For example, different loops may be associated with different I/O channels. The functions performed by each measurement/control loop may be arbitrarily complex, i.e., may differ from the simple example given above of sampling input at periodic intervals.

It is noted that many variations of the method illustrated in FIG. 6 are contemplated. In particular, the request for input performed by the measurement/control program in step 270 may be performed in any of various alternative ways. As one example, a callback routine for accepting the requested input may not need to be specified, e.g., if a configuration utility is used to explicitly associate a callback routine with a particular I/O channel.

Figure 7:
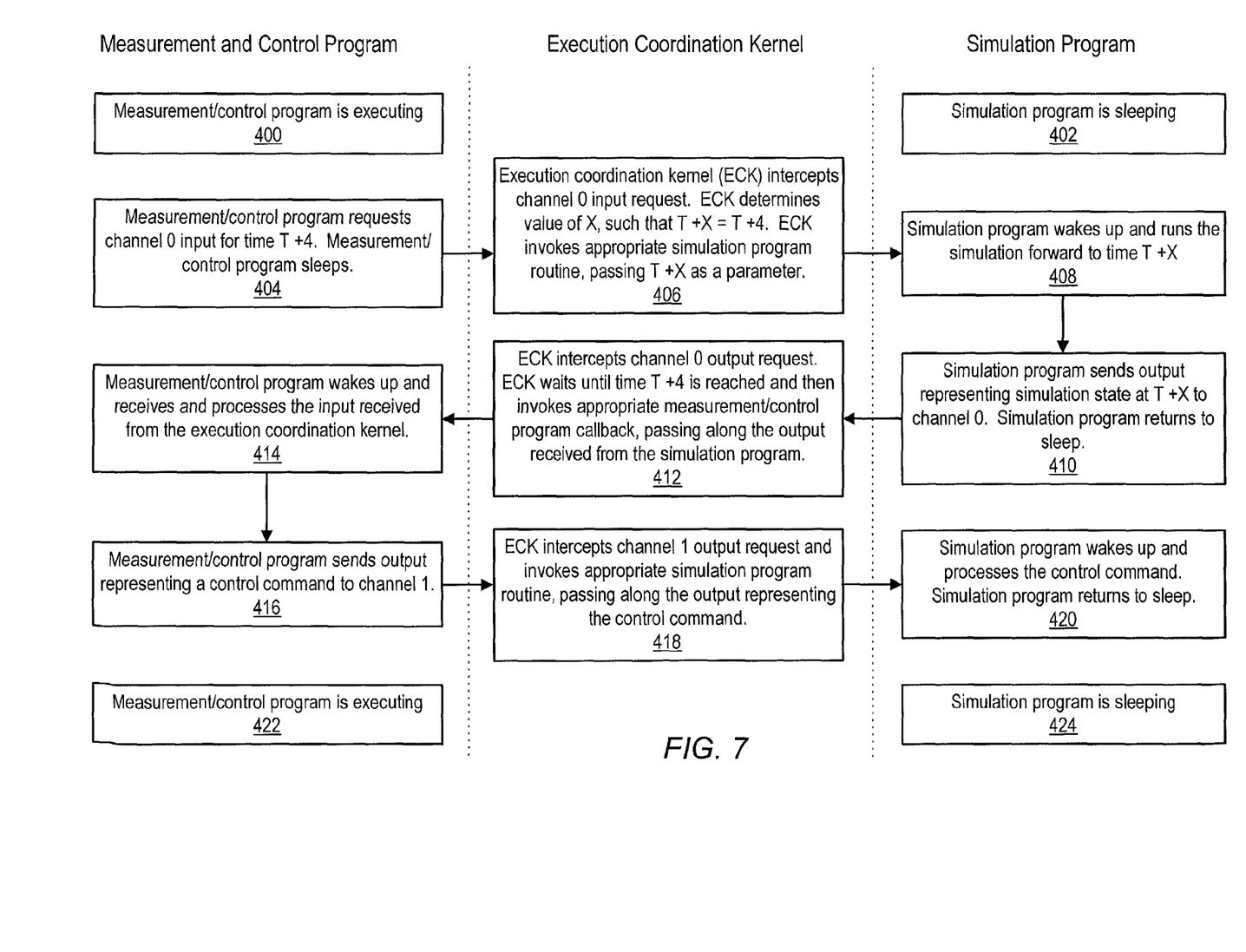
FIG. 7 illustrates an exemplary interaction between a measurement/control program, an execution coordination kernel, and a simulation program.

FIG. 7—Example

FIG. 7 is a chart illustrating a particular application of the system and method described above. FIG. 7 illustrates an exemplary interaction between a measurement/control program, an execution coordination kernel, and a simulation program. As described above, a measurement/control program and a simulation program may each maintain their own local time values. The execution coordination kernel may also keep track of these local time values and may also maintain a global time value that may be used for coordinating the execution and local time values of the programs.

In FIG. 7, each block in the "measurement and control program" column illustrates the local measurement/control program time value for when that block takes place. The times shown in this column are relative to a time value TM, which represents the local time at which block 400 begins. The local time values shown in this column are somewhat arbitrary and are simply used as reference points to indicate time advancement in the measurement/control program.

The time values shown in the "simulation program" column are used somewhat differently from those in the "measurement/control program" column. The measurement/control program time values provide reference points for when the blocks in the "measurement/control program" column occur with respect to program execution. Thus, the time value increases for each successive block. The simulation program time values, on the other hand, indicate the state of the simulation at the point when each block occurs. As described above, a simulation program is typically based on a model of a system that can dynamically change over time. Although different blocks in the "simulation program" may take place at different times with respect to program execution, the state of the simulated system may not change between a given pair of blocks.

With respect to the measurement/control program, the chart of FIG. 7 begins at a time $T_M$ when the measurement/control program is executing, as shown in block 400. As described above, in various embodiments a measurement/control program may be operable to perform any of various processes during execution, in addition to measuring and/or controlling a system or simulated system.

With respect to the simulation program, the chart of FIG. 7 begins when the program is sleeping, in accordance with standard operating system techniques, as shown in block 402. The time value in block 402 shows that the state of the simulated system is currently indicated by a value, $T_S$.

As shown in block 404, the measurement/control program may request input at a time $T_M+4$ via an input channel, channel 0. The $T_M+2$ and $T_M+4$ values and the "0" channel number are arbitrarily chosen for illustration purposes. In one embodiment the measurement/control program may request the input similarly as described above with reference to step 270 of FIG. 6. As described above, the requested input may comprise input specifying various variables indicating the state of the simulated system, which the measurement/control program may use to regulate the simulated system. The $T_M+4$ value may indicate a time value at which the measurement/control program expects the input, e.g., in order to sample the system variables at regular intervals.

In block 406, the execution coordination kernel may intercept the channel 0 input request, as described above. The execution coordination kernel may then determine a local simulation time value which corresponds to the local measurement/control time value $T_M+4$. For example, this determination may be made by normalizing $T_M$ and $T_S$ with respect to a global clock maintained by the execution coordination kernel and computing a value X such that $T_S+X=T_M+4$. As described above, channel 0 input requests may be mapped to a particular simulation program routine, such as a function, component, object, subprogram, etc. The execution coordination kernel may then invoke this routine, passing along the $T_S+X$ value to inform the simulation program that the system variables associated with channel 0 are requested, wherein the values of the variables should reflect the state of the system at a simulation time of $T_S+X$.

As shown in block 408, the simulation program may wake up in response to being invoked by the execution coordination kernel and may run the simulation of the system forward until the time specified by $T_S+X$. The simulation program may run the simulation forward in any of various ways, depending on the model used to create the simulation and how this model is implemented.

In block 410, the time value shown indicates that the state of the simulation is now specified by the value $T_S+X$, after being run forward in block 408. The simulation program may now send the requested output representing the new state of the simulation to channel 0 and may then return to sleep.

In block 412, the execution coordination kernel may intercept the channel 0 output request. When the measurement/control program requested the input in block 404, the program may have specified a callback routine for receiving the input at the designated time. Alternatively, the execution coordination kernel may be configured to invoke a particular routine associated with the measurement/control program in response to intercepting channel 0 output requests. In either case, the execution coordination kernel may invoke the appropriate routine, passing along the output received from the simulation program. As described above with reference to FIG. 6, if the time $T_M+4$ has not yet been reached (as determined by the global clock) then the execution coordination kernel may delay the invocation until that time is reached.

A shown in block 414, the measurement/control program may wake up in response to being invoked by the execution coordination kernel and may process the received input. For example, the input may include variable values for the simulated system that the measurement/control program processes in order to control the system as desired. The time value $T_M+4$ shown in block 414 indicates that the input is received at the desired time, as specified in step 404.

In block 416 the measurement/control program may determine an appropriate control command in response to the processing performed in block 414 and send the command as output, e.g., via channel 1. The time value of $T_M+10$ for block 416 is chosen arbitrarily and simply reflects the advancement of time in the measurement/control program.

Similarly as described above, in block 418 the execution coordination kernel may intercept the channel 1 output request, determine a simulation program software routine associated with channel 1, and pass the output representing the control command to the routine.

As shown in block 420, the simulation program may wake up in response to being invoked by the execution coordination kernel in block 418 and may process the control command. The simulation program may then return to sleep. Processing the control command may involve performing any of various operations. In one embodiment, the simulation program may simply store the control command in an appropriate form so that the next time the simulation is run forward, the control command can be taken into account. Thus, the state of the simulation may remain at the time value $T_S+X$ after block 420 is performed.

Blocks 422 and 424 indicate that the measurement/control and simulation programs may now be in a similar state as when the chart of FIG. 7 begins, wherein the measurement/control program is executing and the simulation program is sleeping.

As noted above, FIG. 7 is exemplary only and illustrates the application of one particular embodiment of the system and method described herein, as applied to one particular type of measurement/control loop. The behavior of the measurement/control program, the simulation program, and/or the execution coordination kernel may be different in other embodiments. For example, the measurement/control program and the simulation program are shown to sleep at various points during their execution, but neither program is required to sleep by the system and method described herein. The programs are shown to sleep in the example of FIG. 7 because this may help to gain a better understanding of the coordination performed by the execution coordination kernel.

Also, the example of FIG. 7 illustrates a relatively simple interaction between various elements of the system. As noted above, in other embodiments, the processes performed in the measurement/control loop may be arbitrarily complex.

As another example of a possible variation, FIG. 7 is illustrated in terms of performing input/output operations via channels. In other embodiments, any of various other models for performing input/output may be employed.

Graphical Program Examples

In various embodiments the measurement/control and simulation programs may be constructed using any of various programming techniques or languages and may run on any of various types of systems. In one embodiment, the measurement/control program and/or the simulation program may be constructed as a graphical program. Graphical programming can enable developers to intuitively model a process and may be especially useful in the fields of system simulation, process control, industrial automation, test and measurement, etc. Examples of popular graphical programming development environments include LabVIEW from National Instruments and Simulink from The MathWorks. Any of various graphical programming development environments or combinations of graphical programming development environments may be used to construct the measurement/control graphical program and/or the simulation graphical program. The graphical programs may then interface according to one embodiment of the system and methods described herein.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system for performing a simulation, the system comprising:

one or more processors;

memory storing program instructions; and an input device;

wherein the program instructions are executable by the one or more processors to:

turn a simulation mode either on or off in response to user input;

receive a request for input from a measurement/control program;

determine whether the simulation mode is turned on or off; and selectively route the request for input to either a simulation program or the input device, depending on whether the simulation mode is turned on or off, wherein selectively routing the request for input comprises:

routing the request for input to the simulation program if the simulation mode is turned on;

routing the request for input to the input device if the simulation mode is turned off.

2. The system of claim 1, wherein the measurement/control program performs the request for input identically, regardless of whether the simulation mode is turned on or off.

3. The system of claim 1, further comprising:

an output device;

wherein the program instructions are further executable by the one or more processors to:

receive a request for output from the measurement/control program; and selectively route the request for output to either the simulation program or the output device, depending on whether the simulation mode is turned on or off, wherein selectively routing the request for output comprises:

routing the request for output to the simulation program if the simulation mode is turned on;

routing the request for output to the output device if the simulation mode is turned off.

4. The system of claim 1, wherein after determining that the simulation mode is turned on and routing the request for input to the simulation program, the program instructions are further executable by the one or more processors to:

receive results for the input request from the simulation program; and pass the results received from the simulation program to the measurement/control program.

5. The system of claim 1, wherein the request for input comprises a request for input through a first I/O channel;

wherein the program instructions are further executable by the one or more processors to determine that the first I/O channel is mapped to a first software routine of the simulation program;

wherein said routing the request for input to the simulation program comprises routing the request for input to the first software routine of the simulation program.

6. The system of claim 1, wherein the program instructions are further executable by the one or more processors to map the first I/O channel to the first software routine of the simulation program in response to user input requesting the first I/O channel to be mapped to the first software routine of the simulation program.

7. The system of claim 1, wherein turning the simulation mode either on and off comprises turning the simulation mode either on or off without requiring the measurement/control program to be modified, wherein the measurement/control program operates correctly, regardless of whether the simulation mode is turned on or off.

8. The system of claim 1, wherein the measurement/control program is stored in the memory and executed by the one or more processors.

9. The system of claim 8, wherein the simulation program is also stored in the memory and executed by the one or more processors.

10. The system of claim 8, wherein the one or more processors are one or more processors of a first computer system included in the system;

wherein the system further includes a second computer system coupled to the first computer system;

wherein the simulation program executes on the second computer system.

11. The system of claim 1, wherein the simulation program executes to simulate a physical system.

12. The system of claim 1, wherein the simulation program executes to simulate operation of a device.

13. The system of claim 1, wherein the measurement/control program comprises a graphical program, wherein the graphical program comprises a plurality of interconnected nodes that visually indicate functionality of the graphical program.

14. The system of claim 1, wherein the simulation program comprises a graphical program, wherein the graphical program comprises a plurality of interconnected nodes that visually indicate functionality of the graphical program.

15. A method for performing a simulation, the method comprising:

turning a simulation mode either on or off in response to user input;

executing a measurement/control program;

executing a simulation program, wherein the simulation program executes to simulate a system;

receiving a request for input from the measurement/control program;

determining whether the simulation mode is turned on or off; and selectively routing the request for input to either the simulation program or an input device, depending on whether the simulation mode is turned on or off, wherein selectively routing the request for input comprises:

routing the request for input to the simulation program if the simulation mode is turned on;

routing the request for input to the input device if the simulation mode is turned off.

16. The method of claim 15, further comprising:

receiving a request for output from the measurement/control program; and selectively routing the request for output to either the simulation program or an output device, depending on whether the simulation mode is turned on or off, wherein selectively routing the request for output comprises:

routing the request for output to the simulation program if the simulation mode is turned on;

routing the request for output to the output device if the simulation mode is turned off.

17. The method of claim 15, further comprising:

after determining that the simulation mode is turned on and routing the request for input to the simulation program, receiving results for the input request from the simulation program, and passing the results received from the simulation program to the measurement/control program.

18. A tangible computer-readable memory medium storing program instructions for performing a simulation, wherein the program instructions are executable to:

turn a simulation mode either on or off in response to user input;

receive a request for input from a measurement/control program;

determine whether the simulation mode is turned on or off; and selectively route the request for input to either a simulation program or an input device, depending on whether the simulation mode is turned on or off, wherein selectively routing the request for input comprises:

routing the request for input to the simulation program if the simulation mode is turned on;

routing the request for input to the input device if the simulation mode is turned off.

19. The tangible computer-readable memory medium of claim 18, wherein the program instructions are further executable to:

receive a request for output from the measurement/control program; and selectively route the request for output to either the simulation program or an output device, depending on whether the simulation mode is turned on or off, wherein selectively routing the request for output comprises:

routing the request for output to the simulation program if the simulation mode is turned on;

routing the request for output to the output device if the simulation mode is turned off.

20. The tangible computer-readable memory medium of claim 18, wherein after determining that the simulation mode is turned on and routing the request for input to the simulation program, the program instructions are further executable to:

receive results for the input request from the simulation program; and pass the results received from the simulation program to the measurement/control program.

* * * * *